(12) United States Patent
Patel et al.

(10) Patent No.: US 11,698,973 B2
(45) Date of Patent: Jul. 11, 2023

(54) PLATFORM SECURITY MECHANISM

(71) Applicant: Intel Corporation, Santa Clara, CA (US)

(72) Inventors: Baiju Patel, Portland, OR (US); Prashant Dewan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/546,243

(22) Filed: Dec. 9, 2021

(65) Prior Publication Data

US 2022/0100863 A1 Mar. 31, 2022

Related U.S. Application Data

(63) Continuation of application No. 16/832,138, filed on Mar. 27, 2020, now Pat. No. 11,205,003.

(51) Int. Cl.
G06F 21/57 (2013.01)
G06F 9/4401 (2018.01)
G06F 21/60 (2013.01)
H04L 9/08 (2006.01)
H04L 9/14 (2006.01)
H04L 9/32 (2006.01)
G06F 21/71 (2013.01)
G06F 21/79 (2013.01)
G06F 21/78 (2013.01)

(52) U.S. Cl.
CPC .......... *G06F 21/575* (2013.01); *G06F 9/4413* (2013.01); *G06F 21/602* (2013.01); *H04L 9/0861* (2013.01); *H04L 9/14* (2013.01); *H04L 9/3278* (2013.01); *G06F 2221/034* (2013.01)

(58) Field of Classification Search
CPC .... G06F 21/575; G06F 9/4413; G06F 21/602; G06F 2221/034; G06F 21/71; G06F 21/79; G06F 9/4401; G06F 21/78; G06F 15/7807; H04L 9/0861; H04L 9/14; H04L 9/3278; H04L 9/0866
See application file for complete search history.

(56) References Cited

U.S. PATENT DOCUMENTS

| | | |
|---|---|---|
| 9,892,265 B1 | 2/2018 | Tripathy et al. |
| 10,078,754 B1 | 9/2018 | Brandwine et al. |
| 10,320,569 B1 * | 6/2019 | Wentz ................. H04L 9/3239 |
| 10,574,466 B1 * | 2/2020 | Gopalakrishnan .... H04L 9/3242 |
| 10,742,421 B1 | 8/2020 | Wentz et al. |
| 2002/0129246 A1 | 9/2002 | Blumenau et al. |
| 2004/0158711 A1 | 8/2004 | Zimmer |
| 2005/0015611 A1 * | 1/2005 | Poisner ................. G06F 21/82 |
| | | 713/189 |
| 2005/0108171 A1 * | 5/2005 | Bajikar ................. G06F 21/57 |
| | | 705/51 |

(Continued)

*Primary Examiner* — Darren B Schwartz
(74) *Attorney, Agent, or Firm* — Jaffery Watson Mendonsa & Hamilton LLP

(57) ABSTRACT

An apparatus to facilitate security within a computing system is disclosed. The apparatus includes a storage drive, a controller, comprising a trusted port having one or more key slots to program one or more cryptographic keys and an encryption engine to receive the cryptographic keys via the one or more key slots, encrypt data written to the storage drive using the cryptographic keys and decrypt data read from the storage drive using the cryptographic keys.

20 Claims, 11 Drawing Sheets

(56) References Cited

U.S. PATENT DOCUMENTS

| | | | |
|---|---|---|---|
| 2005/0108532 A1* | 5/2005 | Bajikar | H04W 12/086 713/171 |
| 2006/0184799 A1* | 8/2006 | Seo | G06F 21/79 713/182 |
| 2007/0180239 A1 | 8/2007 | Fujibayashi et al. | |
| 2008/0063197 A1 | 3/2008 | Jaquette et al. | |
| 2008/0065882 A1 | 3/2008 | Goodman et al. | |
| 2008/0159541 A1* | 7/2008 | Kumar | G06F 21/57 380/278 |
| 2008/0279373 A1* | 11/2008 | Erhart | H04L 9/3249 714/E11.017 |
| 2010/0023739 A1 | 1/2010 | Levit-Gurevich et al. | |
| 2010/0135497 A1* | 6/2010 | Sudhakar | H04L 9/321 380/278 |
| 2010/0281273 A1* | 11/2010 | Lee | F04B 33/00 713/193 |
| 2011/0060915 A1 | 3/2011 | Tai | |
| 2013/0336489 A1* | 12/2013 | Kato | H04L 9/0822 380/285 |
| 2014/0013406 A1* | 1/2014 | Tremlet | G09C 1/00 726/5 |
| 2014/0068246 A1* | 3/2014 | Hartley | H04L 9/0866 713/176 |
| 2014/0089658 A1 | 3/2014 | Raghuram et al. | |
| 2014/0093074 A1 | 4/2014 | Gotze et al. | |
| 2014/0122902 A1 | 5/2014 | Isozaki et al. | |
| 2014/0205089 A1* | 7/2014 | Irwin | H04L 9/0819 380/44 |
| 2014/0258716 A1 | 9/2014 | MacMillan et al. | |
| 2014/0258736 A1* | 9/2014 | Merchan | H04L 9/0866 713/193 |
| 2014/0270177 A1 | 9/2014 | Brickell et al. | |
| 2014/0281531 A1* | 9/2014 | Phegade | H04L 9/0825 713/168 |
| 2016/0253519 A1* | 9/2016 | Broumas | H04L 9/0866 713/189 |
| 2016/0337329 A1* | 11/2016 | Sood | H04L 63/06 |
| 2017/0024569 A1* | 1/2017 | Xing | G06F 13/28 |
| 2018/0097639 A1* | 4/2018 | Gulati | G06F 8/61 |
| 2018/0114012 A1* | 4/2018 | Sood | G06F 21/79 |
| 2018/0204007 A1 | 7/2018 | Rangayyan | |
| 2019/0034617 A1* | 1/2019 | Scarlata | G06F 21/44 |
| 2019/0042766 A1* | 2/2019 | Pappachan | G06F 21/606 |
| 2019/0132136 A1* | 5/2019 | Scarlata | G06F 21/606 |
| 2019/0188397 A1* | 6/2019 | Benson | G06F 21/12 |
| 2020/0082091 A1* | 3/2020 | Areno | G06F 9/45558 |
| 2020/0097682 A1* | 3/2020 | Couillard | G06F 21/72 |
| 2020/0099658 A1 | 3/2020 | Couillard et al. | |
| 2020/0151362 A1* | 5/2020 | Harriman | G06F 21/85 |
| 2020/0159969 A1* | 5/2020 | Shanbhogue | G06F 13/4282 |
| 2020/0285492 A1 | 9/2020 | Mihajlovski et al. | |

* cited by examiner

PLATFORM SECURITY MECHANISM

CROSS REFERENCE TO RELATED APPLICATIONS

The present patent application is a continuation application claiming priority from U.S. application Ser. No. 16/832,138, filed Mar. 27, 2020, the contents of which are incorporated herein in their entirety by reference.

BACKGROUND OF THE DESCRIPTION

A system on chip (SOC) is an integrated circuit that integrates all components of a computer or other electronic system. These components include a central processing unit (CPU), memory, input/output (IO) ports and secondary storage, which are all included on a single substrate or microchip. Additionally, SOCs enable the integration of third part components via a standardized on-die interconnect protocol. However, the addition of such components may lead to security vulnerabilities.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the disclosure may admit to other equally effective embodiments.

DETAILED DESCRIPTION

In the following description, numerous specific details are set forth to provide a more thorough understanding. However, it will be apparent to one of skill in the art that the embodiments may be practiced without one or more of these specific details. In other instances, well-known features have not been described in order to avoid obscuring the embodiments.

In embodiments, a mechanism is provided to secure data written to a non-volatile memory. In such an embodiment, an encryption engine encrypts all data written to, and decrypts all data read from, the non-volatile memory. In further embodiments, a controller incudes a trusted port having one or more slots to program encryption keys into the encryption engine.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
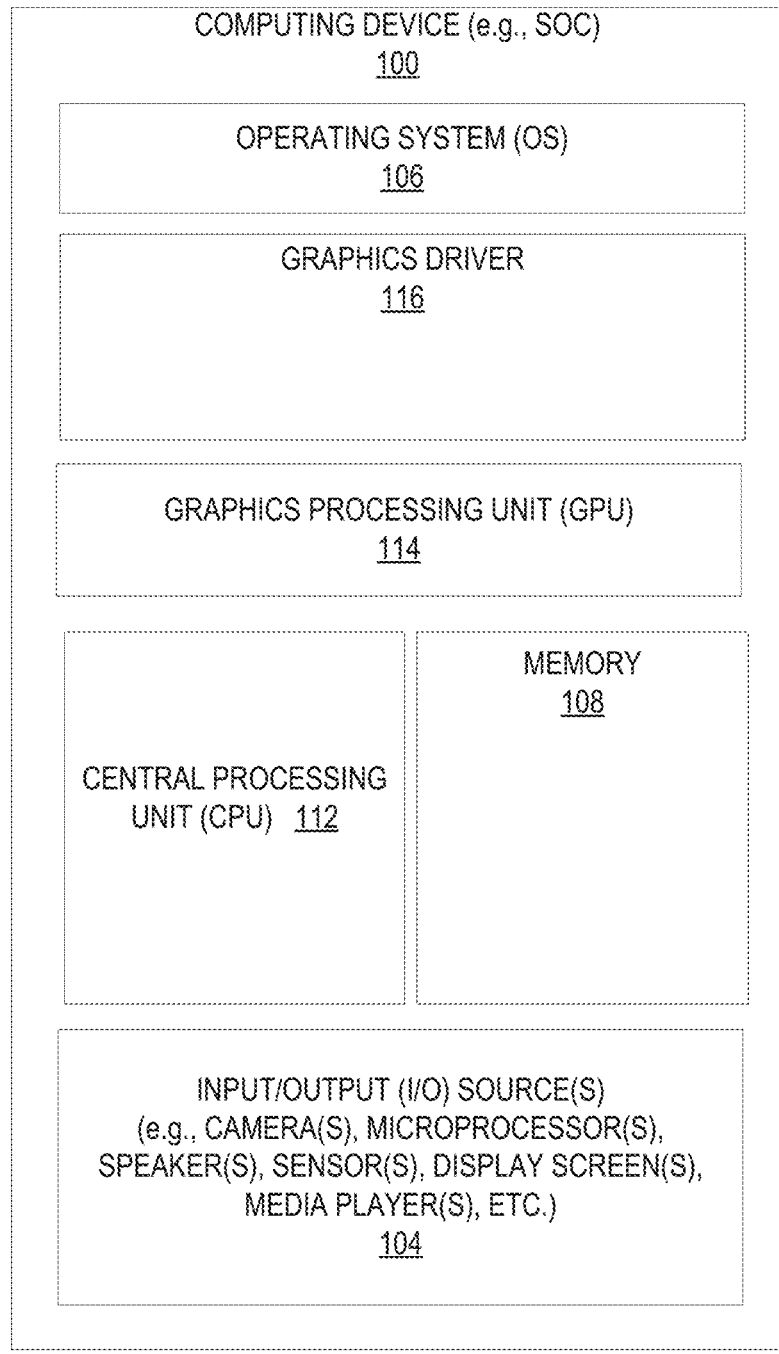
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2:
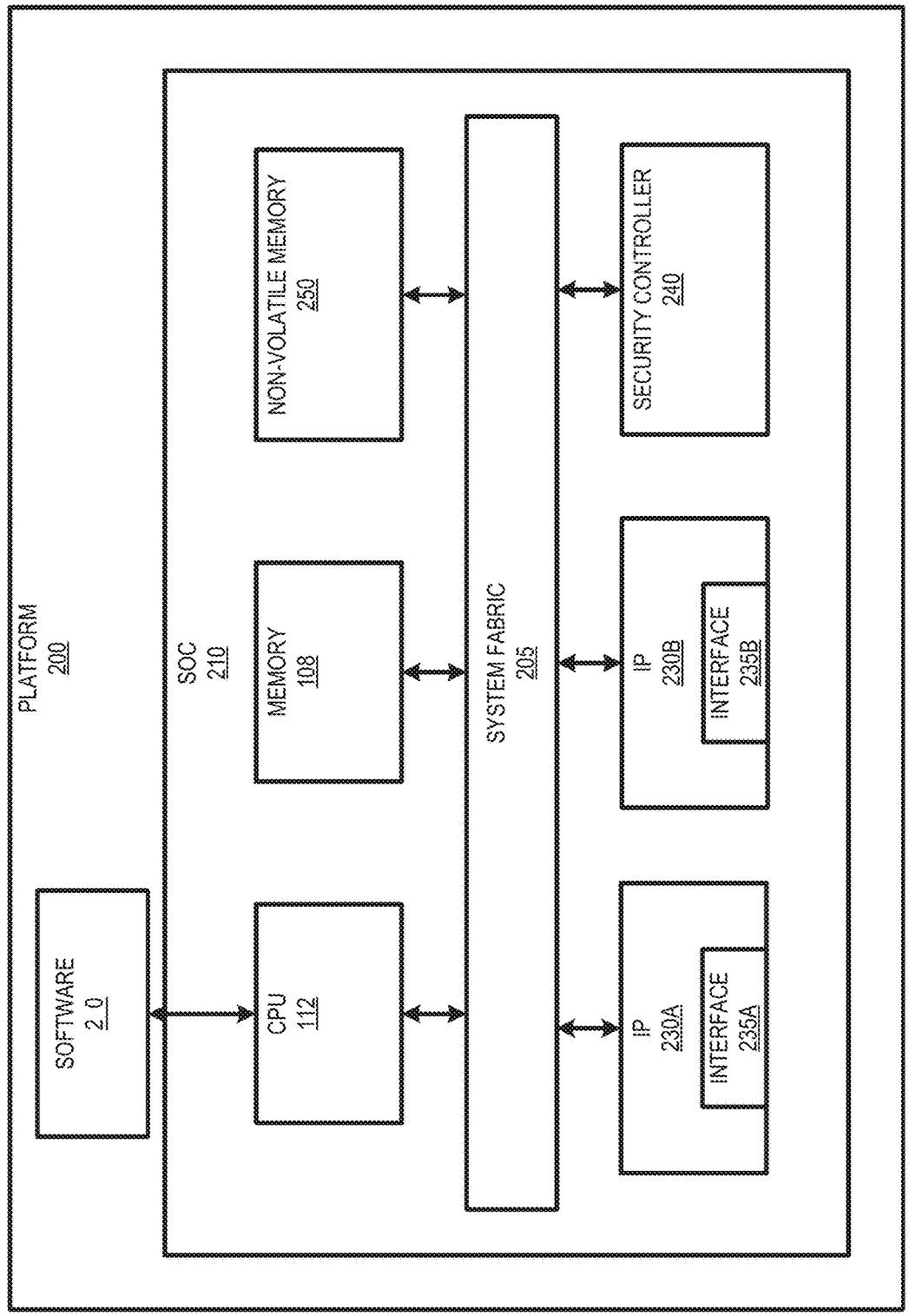
FIG. 2 illustrates one embodiment of a platform.

FIG. 2 illustrates one embodiment of a platform 200 including a SOC 210 similar to computing device 100 discussed above. As shown in FIG. 2, platform 200 includes SOC 210 communicatively coupled to one or more software components 280 via CPU 112. Additionally, SOC 210 includes other computing device components (e.g., memory 108) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP blocks 230A and 230B) within SOC 210. In such an embodiment, the interconnect protocol provides a standardized interface to enable third parties to design logic such as IP agents 130 to be incorporated in SOC 210.

According to embodiment, IP agents 230 may include general purpose processors (e.g., in-order or out-of-order cores), fixed function units, graphics processors, I/O controllers, display controllers, etc. In such an embodiment, each IP agent 230 includes a hardware interface 235 to provide standardization to enable the IP agent 230 to communicate with SOC 210 components. For example, in an embodiment in which IPA agent 230 is a third party visual processing unit (VPU), interface 235 provides a standardization to enable the VPU to access memory 108 via fabric 205.

SOC 210 also includes a security controller 240 that operates as a security engine to perform various security operations (e.g., security processing, cryptographic functions, etc.) for SOC 210. In one embodiment, security controller 240 comprises an IPA agent 230 that is implemented to perform the security operations. Further, SOC 210 includes a non-volatile memory 250. Non-volatile memory 250 may be implemented as a Peripheral Component Interconnect Express (PCIe) storage drive, such as a solid state drives (SSD) or Non-Volatile Memory Express (NVMe) drives.

Many available PCIe drives may be vulnerable (or malicious), which may result in a compromise of user data stored on the drive. Currently, there are many such drives being sold that have vulnerable firmware. As a result, the drives cannot be trusted. Many self-encrypting drives perform encrypt user data in the drive itself (sometimes using firmware and sometimes in hardware). Additionally, malicious PCIe drives may perform direct memory access (DMA) operations into memory 108 to steal data.

According to one embodiment, non-volatile memory 250 includes an encryption engine to encrypt all data written to non-volatile memory 250, as well as decrypt all read requests. In a further embodiment, a PCIe controller within non-volatile memory 250 comprises a trusted port and key slots configured such that cryptographic keys (or keys) are programmed into the encryption engine at a provisioning time. In this embodiment, each key persists in the encryption engine. In still a further embodiment, only write transactions are permitted at the key slots, while read transactions are blocked.

Figure 3:
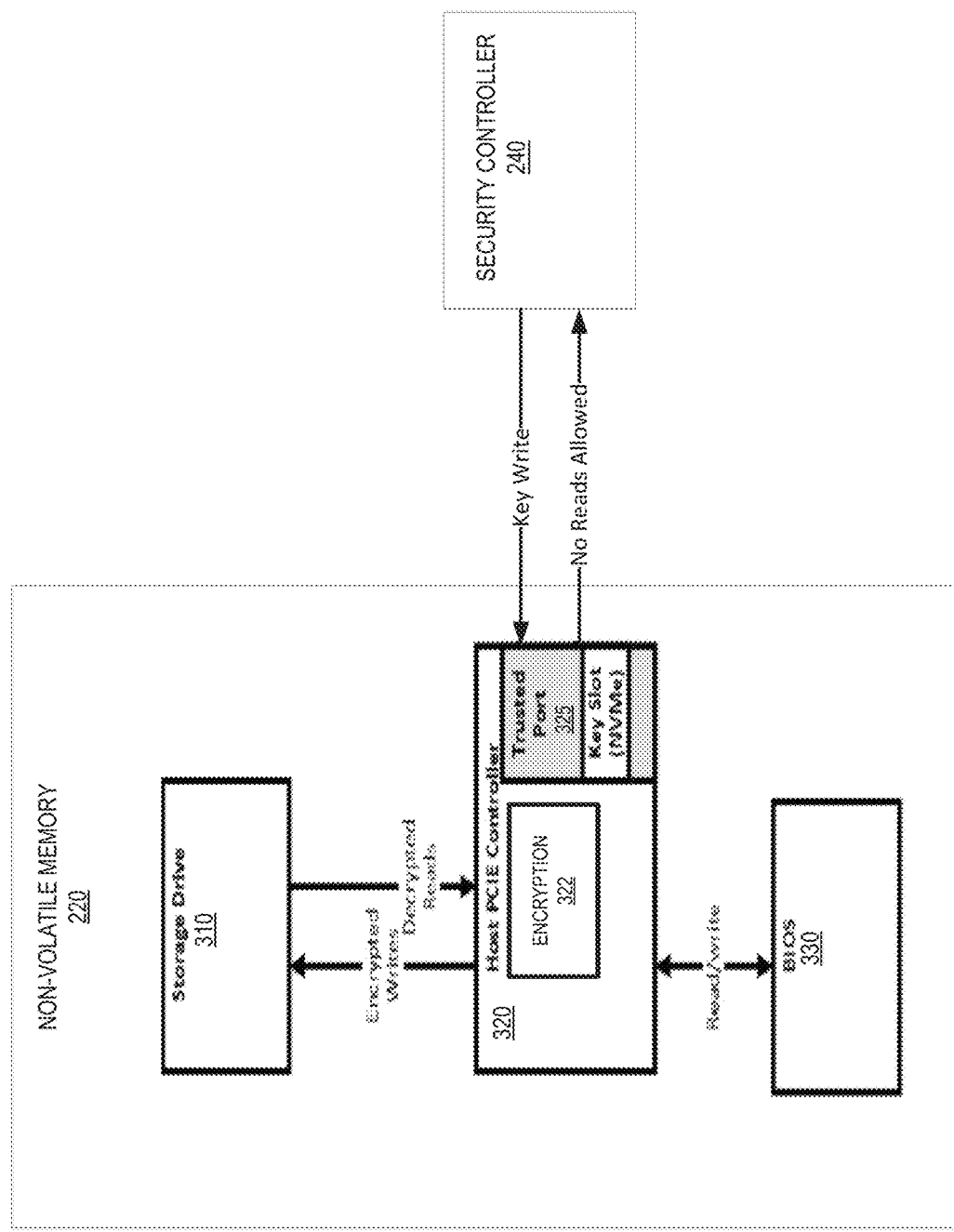
FIG. 3 illustrates one embodiment of a non-volatile memory device coupled to a security controller.

FIG. 3 illustrates one embodiment of non-volatile memory device 250 coupled to security controller 240. As shown in FIG. 3, non-volatile memory device 250 includes a storage drive 310, host PCIe controller 320 and a Basic Input/output System (BIOS) firmware 330 implemented to perform hardware initialization during a power-on startup (or booting process). In one embodiment, storage drive 310 comprises a flash memory device. However other embodiments may implement different types of drives.

A cryptography key comprises a string of characters that is used to lock or unlock cryptographic functions, including authentication, authorization and encryption. Thus, a key is a piece of information (a parameter) that determines the functional output of a cryptographic algorithm. For encryption algorithms, a key specifies the transformation of plaintext into ciphertext, and vice versa for decryption algorithms.

Controller 320 includes an encryption engine 322 and a trusted port 325. According to one embodiment, encryption engine 322 implements Advanced Encryption Standard (AES) and/or XEX-based tweaked-codebook mode with ciphertext stealing (XTS) to encrypt all data received at non-volatile memory device 250. Thus, any device attempting to perform a malicious DMA into system memory is unable to read plain text since the received data is encrypted. Trusted port 325 is implemented to program the keys via security controller 240 and provide the keys to encryption engine 322 via one or more key slots.

According to one embodiment, keys are programmed using manufactured keys. In such an embodiment, the keys are generated during the manufacturing of non-volatile memory device 250. As a result, the trusted port 325 is not accessible postproduction. In another embodiment, security controller 240 is implemented to generate keys. In a further embodiment, security controller 240 may receive the keys from a physically unclonable function (PUF) engine. In such an embodiment, controller 320 may pull a cryptographic key from the PUF engine and write the key to a key slot in trusted port 325. Subsequently, all crypto operations are performed using the key in the key slot. In such an embodiment, an out-of-band mechanism (e.g., a strap or a programmable fuse) may be setup to force controller 320 to rekey itself.

In yet another embodiment, security controller 240 may receive the keys from a fuse controller that pushes keys into trusted port 325. Alternatively, trusted port 325 may pull the keys from the fuse controller and writes the keys to storage drive 310. In this embodiment, a one-time operation and can be re-initiated using an out of band mechanism. In still a further embodiment, security controller 240 may be a manageability engine may be that is used to write the key at the time of platform initialization.

Figure 4:
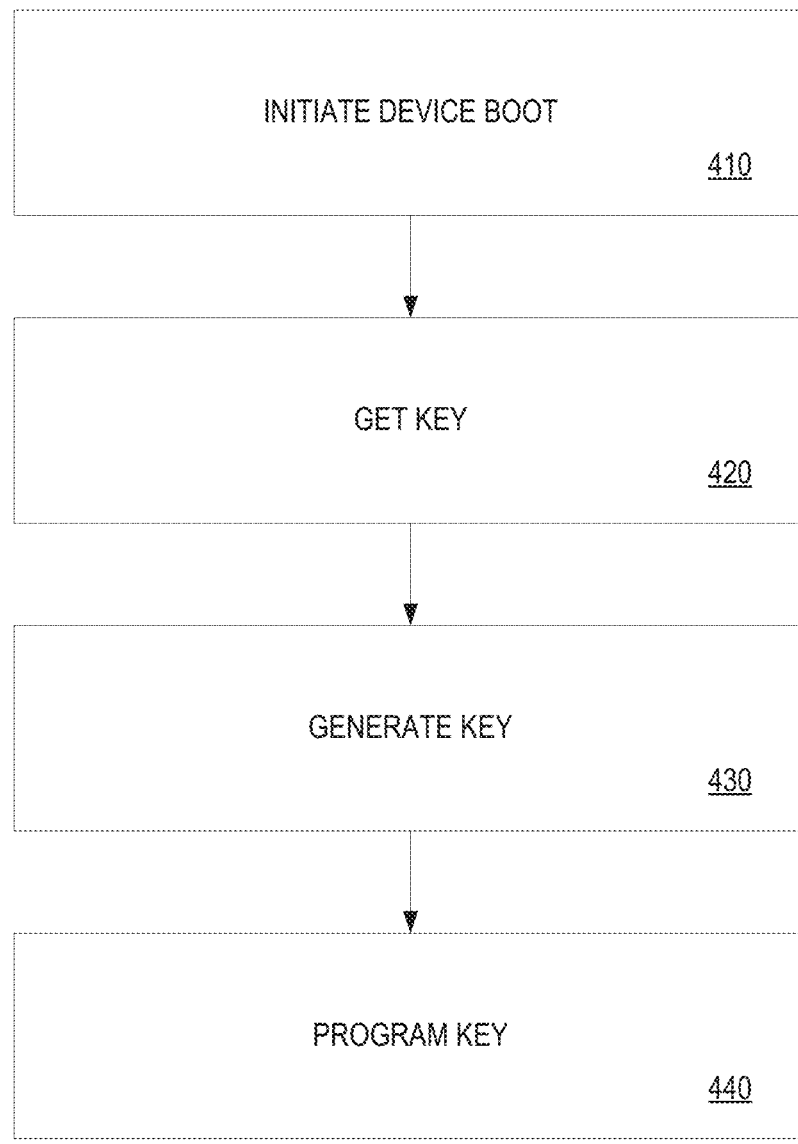
FIG. 4 is a flow diagram illustrating one embodiment of a process for programming a key at a non-volatile memory device.

FIG. 4 is a flow diagram illustrating one embodiment of a process for programming a cryptographic key at non-volatile memory device 220. At processing block 410, a boot process is performed. At processing block 420, security controller 240 receives a key (e.g., via PUF, Fuse, debug port or out of band). At processing block 430, a cryptographic key is generated at the security controller 240. At processing block 440, the key is programmed into PCIe controller 320 via trusted port 325.

Figure 5:
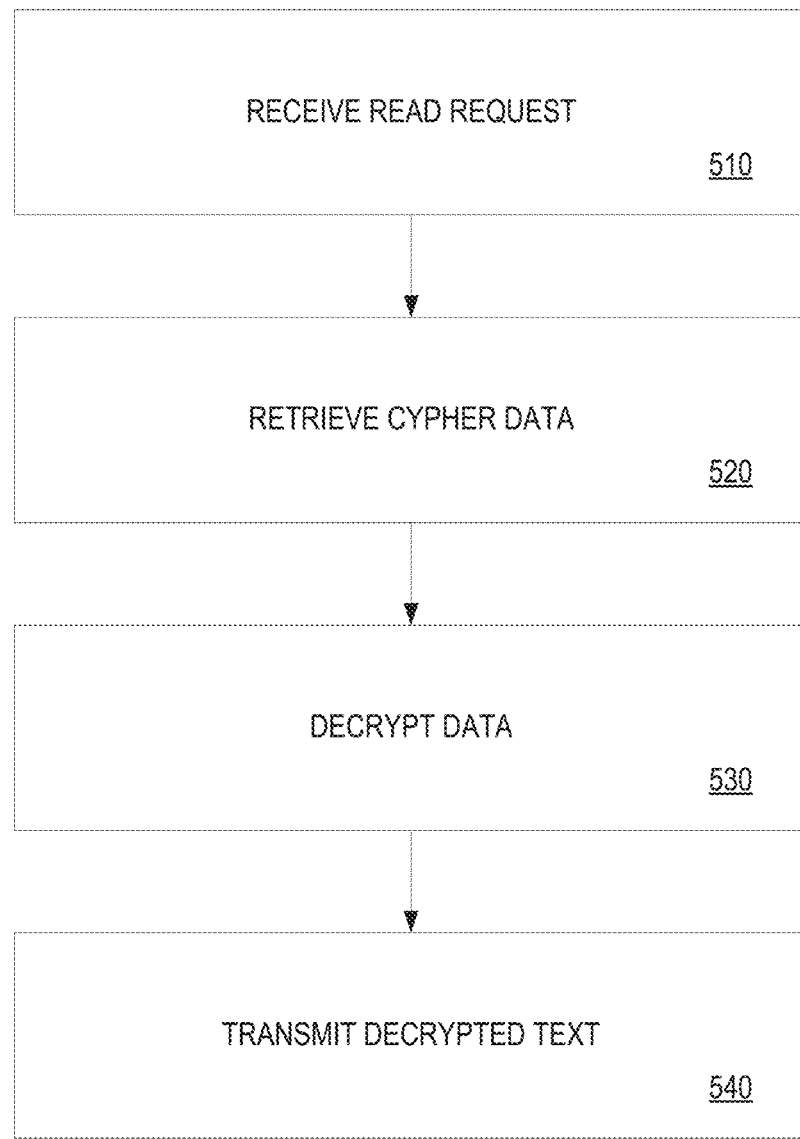
FIG. 5 is a flow diagram illustrating one embodiment of a process for performing a read operation at a non-volatile memory device.

FIG. 5 is a flow diagram illustrating one embodiment of a process for performing a read operation at non-volatile memory device 220. At processing block 510, a read request is received at encryption engine 322. At processing block 520, encryption engine 322 retrieves encrypted (or cypher) data from storage drive 310. At processing block 530, encryption engine 322 decrypts the cypher data. At processing block 540, encryption engine 322 transmits the decrypted data to the requesting entity as read data.

Figure 6A:
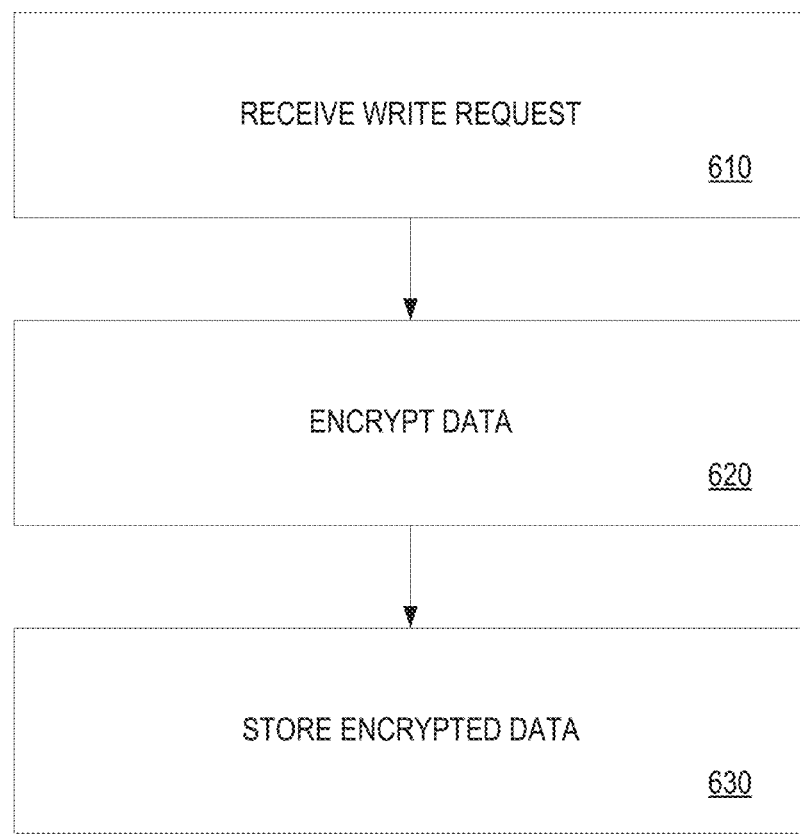
FIG. 6A is a flow diagram illustrating one embodiment of a process for performing a write operation at a non-volatile memory device.
Figure 6B:
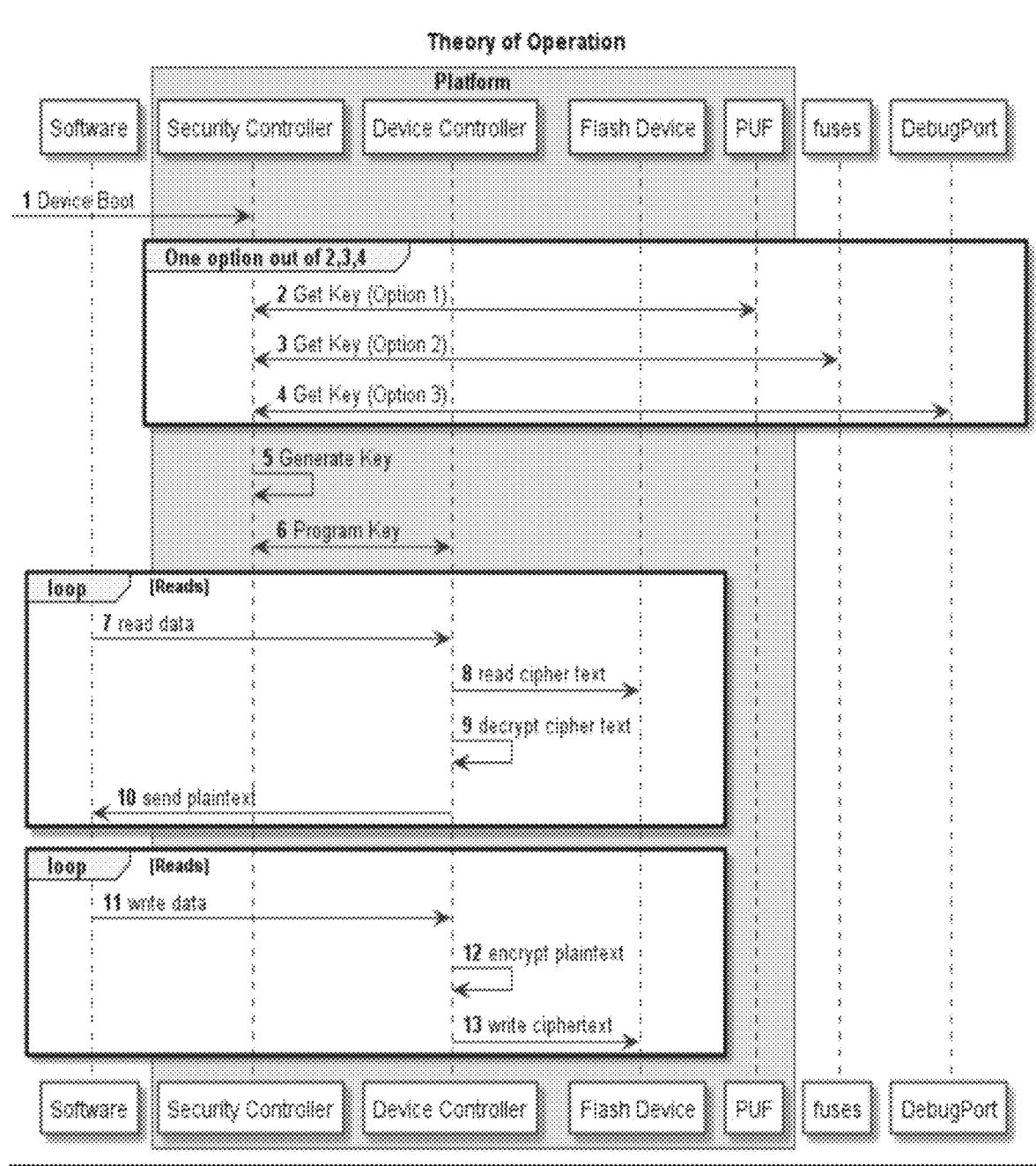
FIG. 6B is a sequence diagram illustrating another embodiment of a process for programming a key and performing read and write operations at a non-volatile memory device.

FIG. 6A is a flow diagram illustrating one embodiment of a process for performing a write operation at non-volatile memory device 220. At processing block 610, a write request is received at encryption engine 322. At processing block 620, encryption engine 322 encrypts the write data. At processing block 630, encryption engine 322 stores the encrypted text to storage drive 310. FIG. 6B is a sequence diagram illustrating another embodiment of a process for programming a key and performing read and write operations at a non-volatile memory device.

In further embodiments, non-volatile memory device 220 may also receive and store encrypted data. In such embodiments, data may be encrypted prior to being received at non-volatile memory device 220 via system fabric 205. In a further embodiment, all SOC data (e.g., data generated within SOC 210) is encrypted within SOC 210 before being stored at non-volatile memory device 220.

According to one embodiment, an OS image is generated offline with a security header at the provisioning station. In such an embodiment, the OS image is written to storage drive 310 at the start and end block addresses of the storage blocks provided in the header. In a further embodiment, a programmer writes a plaintext image on the storage drive 310. Subsequently non-volatile memory device 220 is connected into the platform (e.g., platform 200) and shipped (e.g., without booting). Once booted, the OS image is provisioned at non-volatile memory device 220.

Figure 7A:
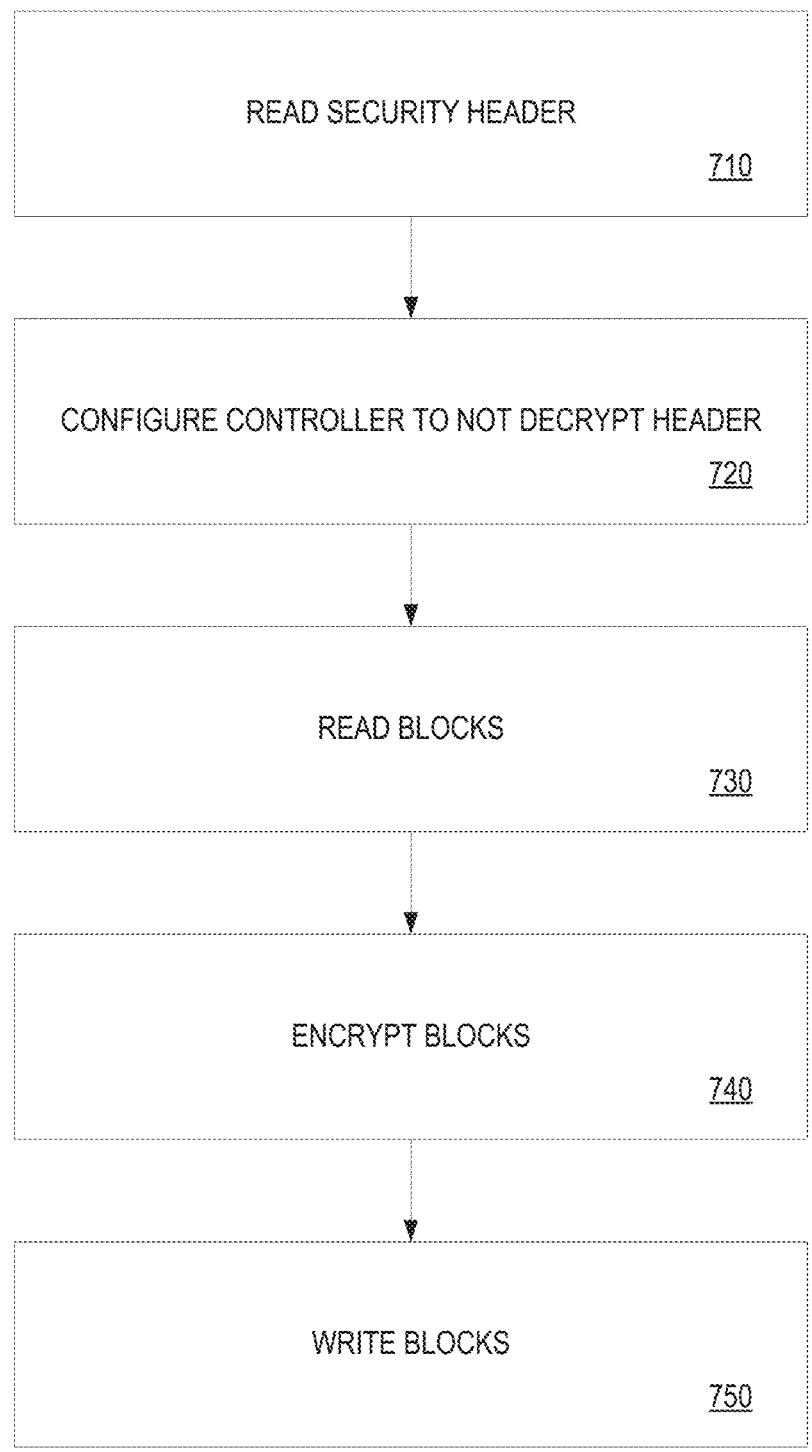
FIG. 7A is a flow diagram illustrating one embodiment of a process for provisioning an operating system image.
Figure 7B:
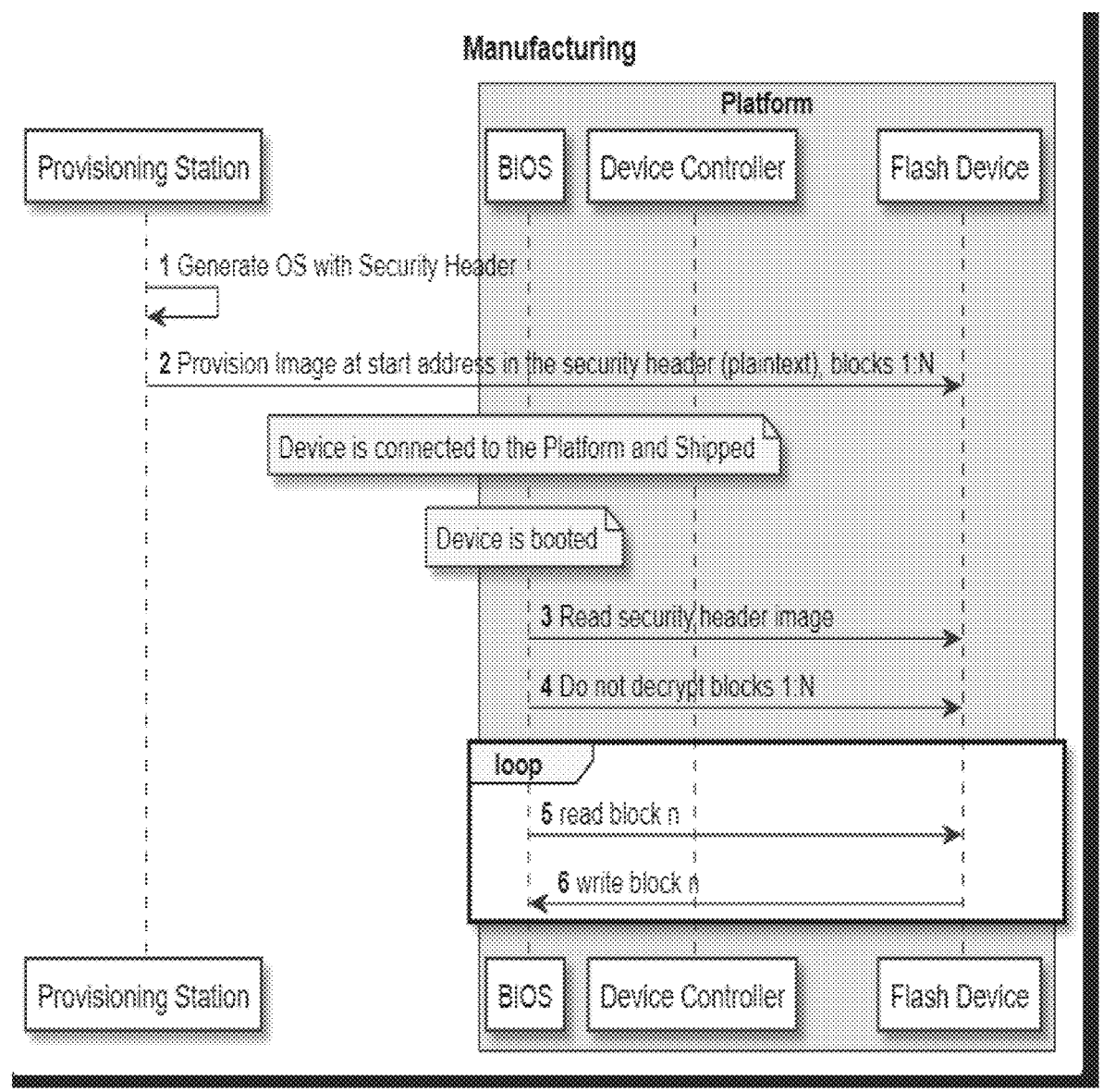
FIG. 7B is a sequence diagram illustrating another embodiment of a process for provisioning an operating system image.

FIG. 7A is a flow diagram illustrating one embodiment of a process for provisioning an OS image during a boot process. At processing block 710, BIOS 330 reads the security header in the image once non-volatile memory device 220 is booted. At processing block 720, BIOS 330 configures PCIe controller 320 that blocks in the storage device indicated in the security header (e.g., between start and end addresses) are not to be decrypted since the data is stored as plain text. At processing block 730, BIOS 330 reads each block from storage drive 310 as plaintext. At processing block 740, the blocks are encrypted by encrypted by PCIe controller 320 using the keys in the key slots. At processing block 750, the encrypted blocks are written back to storage drive 310. FIG. 7B is a sequence diagram illustrating another embodiment of a process for provisioning an operating system image.

Figure 8A:
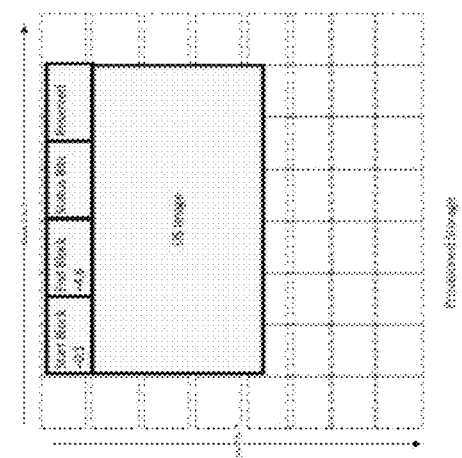
FIGS. 8A&8B illustrates embodiments of operating system image provisioning.
Figure 8B:
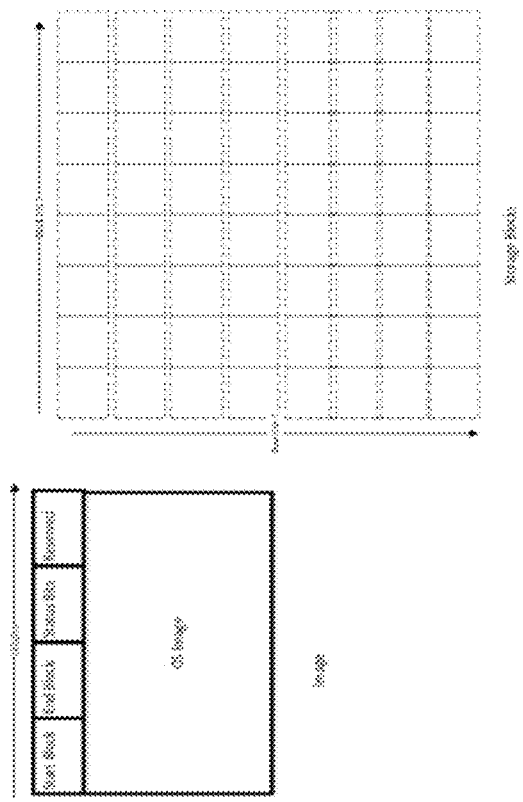

FIGS. 8A&8B illustrates embodiments of operating system image provisioning. FIG. 8A shows an OS image prior to being provisioned in storage blocks. As shown in FIG. 8A, the OS image includes a header that indicates a start block, end block, status bit. FIG. 8B shows the OS image after it has been provisioned in storage. As shown in FIG. 8B, the header shows the actual start blocks and end blocks.

The above-described mechanism protects user data on a non-volatile storage device without the user or software (e.g., OS) involvement. Thus, user data is protected in drives that are stolen, discarded or refurbished. Additionally, the mechanism may be used by flash programmers to provision OS on a drive during manufacturing.

Figure 9:
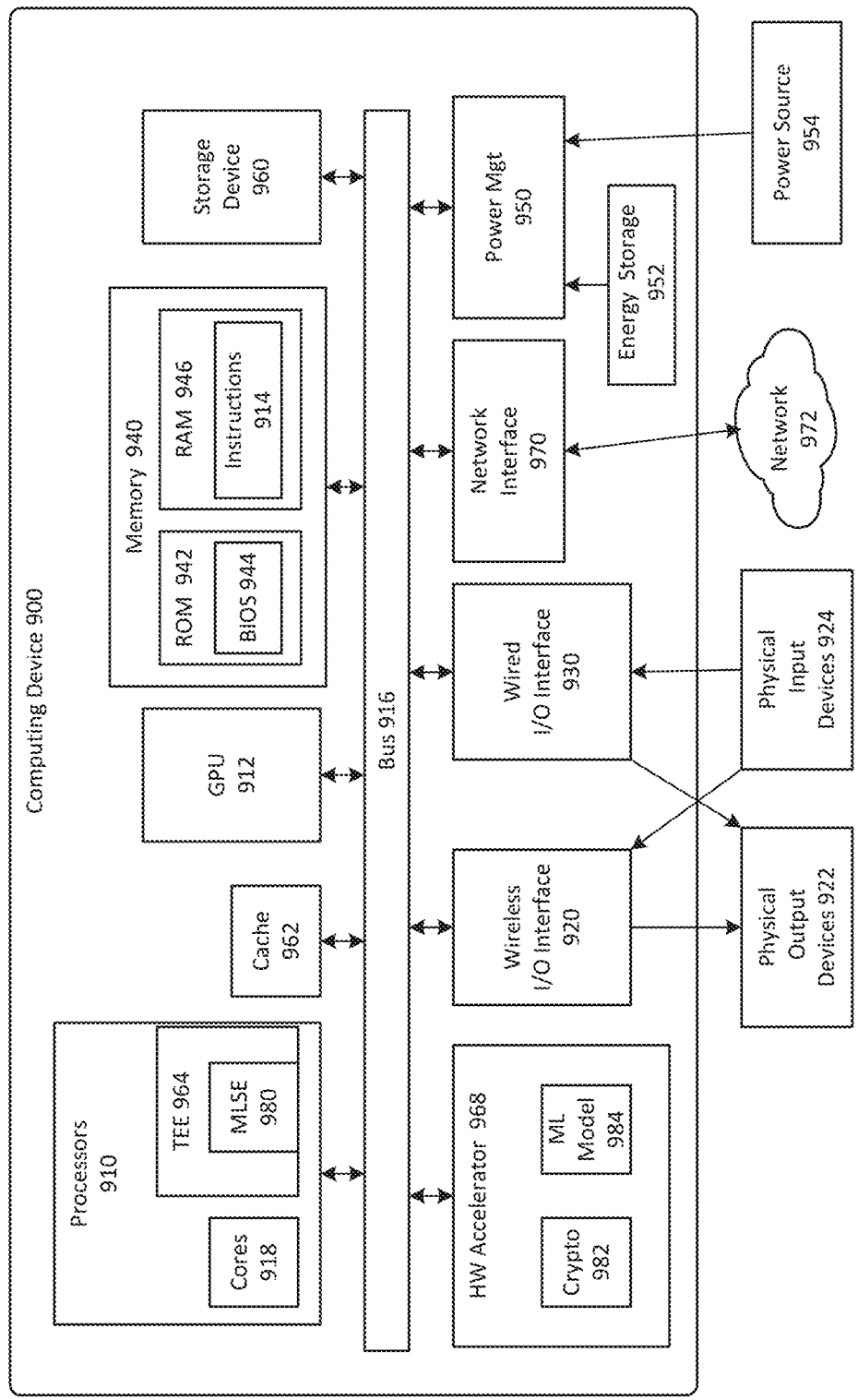
FIG. 9 is a schematic diagram of an illustrative electronic computing device.

FIG. 9 is a schematic diagram of an illustrative electronic computing device to enable enhanced protection against adversarial attacks according to some embodiments. In some embodiments, the computing device 900 includes one or more processors 910 including one or more processors cores 918 and a TEE 964, the TEE including a machine learning service enclave (MLSE) 980. In some embodiments, the computing device 900 includes a hardware accelerator 968, the hardware accelerator including a cryptographic engine 982 and a machine learning model 984. In some embodiments, the computing device is to provide enhanced protections against ML adversarial attacks, as provided in FIGS. 1-8.

The computing device 900 may additionally include one or more of the following: cache 962, a graphical processing unit (GPU) 912 (which may be the hardware accelerator in some implementations), a wireless input/output (I/O) interface 920, a wired I/O interface 930, memory circuitry 940, power management circuitry 950, non-transitory storage device 960, and a network interface 970 for connection to a network 972. The following discussion provides a brief, general description of the components forming the illustrative computing device 900. Example, non-limiting computing devices 900 may include a desktop computing device, blade server device, workstation, or similar device or system.

In embodiments, the processor cores 918 are capable of executing machine-readable instruction sets 914, reading data and/or instruction sets 914 from one or more storage devices 960 and writing data to the one or more storage devices 960. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 918 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 900 includes a bus or similar communications link 916 that communicably couples and facilitates the exchange of information and/or data between various system components including the processor cores 918, the cache 962, the graphics processor circuitry 912, one or more wireless I/O interfaces 920, one or more wired I/O interfaces 930, one or more storage devices 960, and/or one or more network interfaces 970. The computing device 900 may be referred to in the singular herein, but this is not intended to limit the embodiments to a single computing device 900, since in certain embodiments, there may be more than one computing device 900 that incorporates, includes, or contains any number of communicably coupled, collocated, or remote networked circuits or devices.

The processor cores 918 may include any number, type, or combination of currently available or future developed devices capable of executing machine-readable instruction sets.

The processor cores 918 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 9 are of conventional design. Consequently, such blocks need not be described in further detail herein, as they will be understood by those skilled in the relevant art.

The bus 916 that interconnects at least some of the components of the computing device 900 may employ any currently available or future developed serial or parallel bus structures or architectures.

The system memory 940 may include read-only memory ("ROM") 642 and random access memory ("RAM") 946. A portion of the ROM 942 may be used to store or otherwise retain a basic input/output system ("BIOS") 944. The BIOS 944 provides basic functionality to the computing device 900, for example by causing the processor cores 918 to load and/or execute one or more machine-readable instruction sets 914. In embodiments, at least some of the one or more machine-readable instruction sets 914 cause at least a portion of the processor cores 918 to provide, create, produce, transition, and/or function as a dedicated, specific, and particular machine, for example a word processing machine, a digital image acquisition machine, a media playing machine, a gaming system, a communications device, a smartphone, or similar.

The computing device 900 may include at least one wireless input/output (I/O) interface 920. The at least one wireless I/O interface 920 may be communicably coupled to one or more physical output devices 922 (tactile devices, video displays, audio output devices, hardcopy output devices, etc.). The at least one wireless I/O interface 920 may communicably couple to one or more physical input devices 624 (pointing devices, touchscreens, keyboards, tactile devices, etc.). The at least one wireless I/O interface 920 may include any currently available or future developed wireless I/O interface. Example wireless I/O interfaces include, but are not limited to: BLUETOOTH®, near field communication (NFC), and similar.

The computing device 900 may include one or more wired input/output (I/O) interfaces 930. The at least one wired I/O interface 930 may be communicably coupled to one or more physical output devices 922 (tactile devices, video displays, audio output devices, hardcopy output devices, etc.). The at least one wired I/O interface 930 may be communicably coupled to one or more physical input devices 924 (pointing devices, touchscreens, keyboards, tactile devices, etc.). The wired I/O interface 930 may include any currently available or future developed I/O interface. Example wired I/O interfaces include, but are not limited to: universal serial bus (USB), IEEE 1394 ("Fire-Wire"), and similar.

The computing device 900 may include one or more communicably coupled, non-transitory, data storage devices 960. The data storage devices 960 may include one or more hard disk drives (HDDs) and/or one or more solid-state storage devices (SSDs). The one or more data storage devices 960 may include any current or future developed storage appliances, network storage devices, and/or systems. Non-limiting examples of such data storage devices 960 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 960 may include one or more removable storage devices, such as one or more flash drives, flash memories, flash storage units, or similar appliances or devices capable of communicable coupling to and decoupling from the computing device 900.

The one or more data storage devices 960 may include interfaces or controllers (not shown) communicatively coupling the respective storage device or system to the bus 916. The one or more data storage devices 960 may store, retain, or otherwise contain machine-readable instruction sets, data structures, program modules, data stores, databases, logical structures, and/or other data useful to the processor cores 918 and/or graphics processor circuitry 912 and/or one or more applications executed on or by the processor cores 918 and/or graphics processor circuitry 912. In some instances, one or more data storage devices 960 may be communicably coupled to the processor cores 918, for example via the bus 916 or via one or more wired communications interfaces 930 (e.g., Universal Serial Bus or USB); one or more wireless communications interfaces 920 (e.g., Bluetooth®, Near Field Communication or NFC); and/or one or more network interfaces 970 (IEEE 802.3 or Ethernet, IEEE 802.11, or Wi-Fi®, etc.).

Processor-readable instruction sets 914 and other programs, applications, logic sets, and/or modules may be stored in whole or in part in the system memory 940. Such instruction sets 914 may be transferred, in whole or in part, from the one or more data storage devices 960. The instruction sets 914 may be loaded, stored, or otherwise retained in system memory 940, in whole or in part, during execution by the processor cores 918 and/or graphics processor circuitry 912.

The computing device 900 may include power management circuitry 650 that controls one or more operational aspects of the energy storage device 952. In embodiments, the energy storage device 952 may include one or more primary (i.e., non-rechargeable) or secondary (i.e., rechargeable) batteries or similar energy storage devices. In embodiments, the energy storage device 952 may include one or more supercapacitors or ultracapacitors. In embodiments, the power management circuitry 950 may alter, adjust, or control the flow of energy from an external power source 954 to the energy storage device 952 and/or to the computing device 900. The power source 954 may include, but is not limited to, a solar power system, a commercial electric grid, a portable generator, an external energy storage device, or any combination thereof.

For convenience, the processor cores 918, the graphics processor circuitry 912, the wireless I/O interface 920, the wired I/O interface 930, the storage device 960, and the network interface 970 are illustrated as communicatively coupled to each other via the bus 916, thereby providing connectivity between the above-described components. In alternative embodiments, the above-described components may be communicatively coupled in a different manner than illustrated in FIG. 9. For example, one or more of the above-described components may be directly coupled to other components, or may be coupled to each other, via one or more intermediary components (not shown). In another example, one or more of the above-described components may be integrated into the processor cores 918 and/or the graphics processor circuitry 912. In some embodiments, all or a portion of the bus 916 may be omitted and the components are coupled directly to each other using suitable wired or wireless connections.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In various implementations, the computing device may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device may be any other electronic device that processes data or records data for processing elsewhere.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus to facilitate security within a computing system comprising a non-volatile memory, including a storage drive, a controller, comprising a trusted port having one or more key slots to program one or more cryptographic keys and an encryption engine to receive the cryptographic keys via the one or more key slots, encrypt data written to the storage drive using the cryptographic keys and decrypt data read from the storage drive using the cryptographic keys.

Example 2 includes the subject matter of Example 1, wherein the one or more cryptographic keys are programmed into the controller during manufacture of the non-volatile memory.

Example 3 includes the subject matter of Examples 1 and 2, wherein the non-volatile memory further comprises a security controller to generate the cryptographic keys.

Example 4 includes the subject matter of Examples 1-3, wherein the security controller receives the cryptographic keys from a physically unclonable function (PUF) engine.

Example 5 includes the subject matter of Examples 1-4, wherein the security controller receives the cryptographic keys from a fuse controller.

Example 6 includes the subject matter of Examples 1-5, wherein the non-volatile memory further comprises Basic Input/Output System (BIOS) firmware to provision an operating system image into the non-volatile memory during a booting process.

Example 7 includes the subject matter of Examples 1-6, wherein the BIOS firmware reads a security header included in the operating system image.

Example 8 includes the subject matter of Examples 1-7, wherein the security header provides an indication of storage blocks in the storage drive storing the operating system image as plain text.

Example 9 includes the subject matter of Examples 1-8, wherein the BIOS firmware configures the controller to not decrypt storage blocks in the storage device indicated in the security header.

Example 10 includes the subject matter of Examples 1-9, wherein the BIOS reads the operating system image from the storage blocks.

Example 11 includes the subject matter of Examples 1-10, wherein the controller encrypts the operating system image via the cryptographic keys and stores the encrypted operating system image to the storage drive.

Some embodiments pertain to Example 12 that includes a method to facilitate security of a non-volatile memory, comprising receiving a write request to write data to the non-volatile memory, encrypting the write data at an encryption engine included in the non-volatile memory via one or more cryptographic keys and storing the encrypted write data at a storage drive within the non-volatile memory.

Example 13 includes the subject matter of Example 12, further comprising receiving a read request to read data from the non-volatile memory, retrieving encrypted data from the storage drive within the non-volatile memory and decrypting the data at the encryption engine via the one or more cryptographic keys.

Example 14 includes the subject matter of Examples 12 and 13, further comprising transmitting the data.

Some embodiments pertain to Example 15 that includes a computing device comprising a processor, a memory device, a fabric interface coupled between the processor and the memory device and a non-volatile memory, coupled to the fabric interface including, a storage drive, a controller comprising a trusted port having one or more key slots to program one or more cryptographic keys and an encryption engine to receive the cryptographic keys via the one or more key slots, encrypt data written to the storage drive using the cryptographic keys and decrypt data read from the storage drive using the cryptographic keys.

Example 16 includes the subject matter of Example 15, wherein the one or more cryptographic keys are programmed into the controller during manufacture of the non-volatile memory.

Example 17 includes the subject matter of Examples 15 and 16, further comprising a security controller, coupled to the fabric interface, to generate the cryptographic keys.

Example 18 includes the subject matter of Examples 15-17, wherein the security controller receives the cryptographic keys from a physically unclonable function (PUF) engine.

Example 19 includes the subject matter of Examples 15-18, wherein the security controller receives the cryptographic keys from a fuse controller.

Example 20 includes the subject matter of Examples 15-19, wherein the non-volatile memory further comprises Basic Input/Output System (BIOS) firmware to provision an operating system image into the non-volatile memory during a booting process.

The embodiments of the examples have been described above with reference to specific embodiments. Persons skilled in the art, however, will understand that various modifications and changes may be made thereto without departing from the broader spirit and scope as set forth in the appended claims. The foregoing description and drawings are, accordingly, to be regarded in an illustrative rather than a restrictive sense.

What is claimed is:

1. An apparatus comprising:
   a non-volatile memory, including:
   a storage drive;
   a host controller, comprising a trusted port having one or more key slots to program one or more cryptographic keys;
   an encryption engine to receive the cryptographic keys via the one or more key slots, encrypt data written to the storage drive using the cryptographic keys and decrypt data read from the storage drive using the cryptographic keys; and
   a security controller to receive a key from a physically unclonable function (PUF) engine, generate the cryptographic keys using the received key and provide the cryptographic keys to the encryption engine via the one or more key slots.

2. The apparatus of claim 1, wherein the one or more cryptographic keys are programmed into the controller during manufacture of the non-volatile memory.

3. The apparatus of claim 1, wherein the security controller receives the cryptographic keys from a fuse controller.

4. The apparatus of claim 1, wherein the non-volatile memory further comprises Basic Input/Output System (BIOS) firmware to provision an operating system image into the non-volatile memory during a booting process.

5. The apparatus of claim 4, wherein the BIOS firmware reads a security header included in the operating system image.

6. The apparatus of claim 5, wherein the security header provides an indication of storage blocks in the storage drive storing the operating system image as plain text.

7. The apparatus of claim 6, wherein the BIOS firmware configures the host controller to not decrypt the storage blocks in the storage drive indicated in the security header.

8. The apparatus of claim 7, wherein the BIOS reads the operating system image from the storage blocks.

9. The apparatus of claim 8, wherein the host controller encrypts the operating system image via the cryptographic keys and stores the encrypted operating system image to the storage drive.

10. A method comprising:
    receiving a key at a host controller from a physically unclonable function (PUF) engine;
    generate cryptographic keys using the received key;
    programming the cryptographic keys into a trusted port having one or more key slots in the host controller; and
    performing cryptographic operations via the cryptographic keys in the one or more key slots.

11. The method of claim 10, further comprising:
    receiving a write request at the host controller to write data to a non-volatile memory;
    encrypting the write data using the one or more cryptographic keys; and
    storing the encrypted write data at a storage drive within the non-volatile memory.

12. The method of claim 11, further comprising:
    receiving a read request to read data from the non-volatile memory;
    retrieving encrypted data from the storage drive within the non-volatile memory; and
    decrypting the data at an encryption engine via the one or more cryptographic keys.

13. A computing device comprising:
    a processor;
    a memory device;
    a fabric interface coupled between the processor and the memory device; and
    a non-volatile memory, coupled to the fabric interface, including:
    a storage drive;
    a host controller comprising a trusted port having one or more key slots to program one or more cryptographic keys; and
    a encryption engine to receive the cryptographic keys via the one or more key slots, encrypt data written to the storage drive using the cryptographic keys and decrypt data read from the storage drive using the cryptographic keys; and
    a security controller to receive a key from a physically unclonable function (PUF) engine, generate the cryptographic keys using the received key and provide the cryptographic keys to the encryption engine via the one or more key slots.

14. The computing device of claim 13, wherein the one or more cryptographic keys are programmed into the host controller during manufacture of the non-volatile memory.

15. The computing device of claim 13, wherein the non-volatile memory further comprises Basic Input/Output System (BIOS) firmware to provision an operating system image into the non-volatile memory during a booting process.

16. The computing device of claim 15, wherein the BIOS firmware reads a security header included in the operating system image.

17. The computing device of claim 16, wherein the security header provides an indication of storage blocks in the storage drive storing the operating system image as plain text.

18. The computing device of claim 17, wherein the BIOS firmware configures the controller to not decrypt the storage blocks in the storage device indicated in the security header.

19. The computing device of claim 18, wherein the BIOS reads the operating system image from the storage blocks.

20. The computing device of claim 19, wherein the host controller encrypts the operating system image via the cryptographic keys and stores the encrypted operating system image to the storage drive.

\* \* \* \* \*